(12) United States Patent
Eid et al.

(10) Patent No.: US 11,308,757 B2
(45) Date of Patent: Apr. 19, 2022

(54) GAMING APPARATUS AND METHOD

(71) Applicant: AMERSON GLOBAL GAMING PTY LTD, Oak Flats (AU)

(72) Inventors: Linda Maree Eid, Oak Flats (AU); Nick Roach, Brisbane (AU)

(73) Assignee: AMERSON GLOBAL GAMING PTY LTD, Oak Flats (AU)

( * ) Notice: Subject to any disclaimer, the term of this patent is extended or adjusted under 35 U.S.C. 154(b) by 0 days.

(21) Appl. No.: 16/627,927

(22) PCT Filed: Jul. 3, 2018

(86) PCT No.: PCT/AU2018/050689
§ 371 (c)(1),
(2) Date: Dec. 31, 2019

(87) PCT Pub. No.: WO2019/006502
PCT Pub. Date: Jan. 10, 2019

(65) Prior Publication Data
US 2021/0150855 A1 May 20, 2021

(30) Foreign Application Priority Data
Jul. 3, 2017 (AU) .................................. 2017902573

(51) Int. Cl.
*G07F 17/32* (2006.01)
(52) U.S. Cl.
CPC ........ *G07F 17/3239* (2013.01); *G07F 17/322* (2013.01); *G07F 17/3288* (2013.01)

(58) Field of Classification Search
CPC ............... G07F 17/3239; G07F 17/322; G07F 17/3288; G07F 17/3272; A63F 2003/00164
See application file for complete search history.

(56) References Cited

U.S. PATENT DOCUMENTS

| | | | | |
|---|---|---|---|---|
| 2002/0074726 | A1* | 6/2002 | Yoseloff ............... | G07F 17/3244 273/274 |
| 2009/0131151 | A1* | 5/2009 | Harris .................... | G07F 17/32 463/22 |
| 2009/0189351 | A1* | 7/2009 | Baerlocher ......... | G07F 17/3211 273/309 |
| 2011/0034237 | A1* | 2/2011 | Schulhof ................. | A63F 1/00 463/25 |

\* cited by examiner

*Primary Examiner* — Jasson H Yoo
(74) *Attorney, Agent, or Firm* — Leason Ellis LLP

(57) ABSTRACT

A gaming apparatus (8) which includes a game table (10) is disclosed, for playing a feature game during the playing of a table game. The apparatus includes a computer system (16) having features including a bet data receiving component (18). This component can receive respective bet data relating to the different player positions (12) at the game table, and to wager amounts allocated to the feature game. A CPU (26) can determine feature game triggering criteria, to which player positions feature game awards are to be made, and their amounts. The computer system may include a random number generator (22) for generating a random number, which may satisfy feature game triggering criteria. The invention also extends to a method of gaming.

28 Claims, 1 Drawing Sheet

GAMING APPARATUS AND METHOD

CROSS-REFERENCE TO RELATED PATENT APPLICATIONS

This is a U.S. National Phase Application under 35 U.S.C. § 371 of International Patent Application No. PCT/AU2018/050689, filed Jul. 3, 2018, and claims priority to Australian Patent Application No. 2017902573, filed Jul. 3, 2017, each of which is incorporated by reference as if presented in its respective entirety. The International Application was published on Jan. 10, 2019, as International Publication No. WO 2019/006502 A1.

FIELD OF THE INVENTION

The present invention relates to a gaming apparatus which includes one or more game table, for the playing of one or more table games, together with a feature game that is played in parallel with the one or more table games. The invention also relates to a corresponding method of gaming.

In particular, the feature games enable the awarding of one or more prizes to players even if they have not achieved winning outcomes in the table games themselves, and do not necessarily require additional bets to be placed or the occurrence of specific patterns or results that are applicable for winning the table games, and can attribute prizes based on the initial bets placed.

BACKGROUND TO THE INVENTION

Table games are well known in casinos and include, but are not limited to, the games of Blackjack, Roulette, Baccarat, Sic Bo and Money Wheels.

Table games are traditionally played between players and the "house"—i.e. the establishment at which the games are played.

Typically, with table games, after a player places a bet and a game is initiated, the outcome of the game determines if the player is awarded a prize or not. Often, the prize awarded to a winning player is a multiple of the bet made by the player. If the outcome of the game is not a winning outcome in favour of the player, the amount bet by the player is forfeited to the "house".

Typically, the prize to be awarded to a winning player— such as the particular multiple of the bet placed by the player—is determined by a set of rules applicable to the particular game at the establishment. Depending on the type of table game in question, the determination of whether there is a winning outcome is based on whether there are winning patterns or combinations, such as those appearing on playing cards, or other specific outcomes.

For example, in the game of Roulette, awards in the form of different multiples of initial bets made by players are determined based on the types of bets placed, such as bets placed on single numbers, set of numbers, types of number or colours of numbers.

Players that often play such known table games may suffer waning interest in such games.

One way of seeking to ameliorate this problem is to provide for the possibility of a winning outcome for a player even where the player fails to achieve a winning outcome in the table game itself.

Accordingly, embodiments of this invention relate to ways of players being able to win prizes on table games even when there is no winning pattern, combination or specific outcome in the table games themselves for the player positions at the table games.

The basic concept of having feature games combined with existing types of table game is known. However, one limitation of such combined table games is that they are unable to automatically determine details of bets placed and other factors that would make the players placing the bets eligible to win the feature games and that would be used to determine the nature of the awards given on winning the feature games. This problem is especially notable in cases where players place different bets at different player positions at a particular gaming table, or where multiple players place bets at a single such player position.

In addition, in such known combined games, the outcome of the feature game is typically based on the outcome of the main table game or at least based on the rules or method of playing the main table game. This is limiting on the nature of feature game that may be involved.

It is an object of the present invention to provide a way to ameliorate disadvantages or shortcomings of the prior art, or to provide a useful alternative thereto.

SUMMARY OF THE INVENTION

According to a first aspect of the invention there is provided a gaming apparatus for playing a feature game during the playing of a table game by one or more players, the table game having predetermined table game winning criteria, the apparatus including:

at least one gaming table for playing a table game, the or each gaming table having one or a plurality of predetermined player positions, wherein, when the gaming table has one player position, that position is a position for the playing of the feature game and table game by at least one player, and when the gaming table has a plurality of player positions, each position of said a plurality of player positions is a position for the playing of the feature game and table game by a respective at least one player; and a gaming computer system, the computer system including
 a bet data receiving component,
 a temporary memory,
 a programmable unit containing trigger data, the trigger data representing feature game triggering criteria which differ from the table game winning criteria, and eligibility data representing eligibility criteria which are to be satisfied before the feature game can be triggered, and
 a CPU,
 wherein
 the or each player position is adapted for the or each of the at least one player at the or each player position to place a position wager, consisting of at least one bet, at that player position, the position wager including at least a table game portion for playing the associated table game and at least a feature portion;
 and wherein
 the bet data receiving component is adapted to receive respective bet data in relation to the or each player position, the bet data representing an identity of that player position and representing a quantum of the or each feature portion of the or each position wager placed at that player position by the or each player playing at that position;
 the temporary memory is adapted to store the bet data received by the bet data receiving component; and the CPU is adapted to determine feature game triggering criteria of the apparatus, and, provided the feature game can be triggered based on the eligibility criteria being satisfied, and provided the feature game triggering criteria determined by the CPU are satisfied, to determine, based on the trigger data, to which of the player positions a feature game award is to be made and the quantum of that award.

In a preferred embodiment of the invention the computer system includes a random number generator which is adapted to trigger a random number;

the CPU is adapted to determine whether the generated random number satisfies the feature game triggering criteria of the apparatus; and the CPU is adapted, provided the feature game can be triggered based on the eligibility criteria being satisfied, and provided the random number satisfies the feature game triggering criteria, to determine, based on the trigger data, to which of the player positions a feature game award is to be made and the quantum of that award In a preferred embodiment of the invention the random number generator is adapted to trigger a random feature number, and the CPU is adapted to determine to which of the player positions a feature game award is to be made and the quantum of that award, based on the feature number.

In a preferred embodiment of the invention the CPU is adapted, if the generated random number satisfies feature game triggering criteria, to determine, based on the trigger data, and if there is a plurality of players at at least one of the respective player positions, to which of the players at said at least one of the respective player positions a feature game award is to be made and the quantum of that award.

In a preferred embodiment of the invention the bet data receiving component is adapted to receive respective bet data from bet detection apparatus which is adapted to automatically detect the or each player position and the quantum of the or each position wager placed at the or each respective position.

In a preferred embodiment of the invention, the bet detection apparatus includes one or more optical detection component, such as at least one camera.

In a preferred embodiment of the invention, the bet detection apparatus includes one or more electronic detector, such as at least one Radio-frequency identification (RFID) receiver, and/or such as at least one mobile telephone receiver adapted to receive data from remote mobile telephone devices.

In a preferred embodiment of the invention the CPU is adapted to determine whether the generated random number satisfies feature game triggering criteria to enable triggering of the feature game, based on bet data that has been received by the bet data receiving component.

In a preferred embodiment of the invention the CPU is adapted, if the generated random number satisfies feature game triggering criteria, to determine a quantum of an award to be made as part of the feature game, based on bet data that has been received by the bet data receiving component.

In a preferred embodiment of the invention, the apparatus includes a plurality of gaming tables.

In a preferred embodiment of the invention, the plurality of gaming tables are for playing a plurality of associated different types of table game.

In a preferred embodiment of the invention, the programmable unit includes memory storage for storing the trigger data.

In a preferred embodiment of the invention, the eligibility data represents eligibility criteria for determining whether the or each feature portion of the or each position wager at the or each player position is sufficient to satisfy the eligibility criteria before the feature game can be triggered.

In one preferred embodiment of the invention, the trigger data includes probability data representing a probability of an occurrence of a triggering of the feature game.

In another preferred embodiment of the invention, the trigger data includes probability determining data for determining a probability of an occurrence of a triggering of the feature game.

In this case, preferably, the gaming apparatus is adapted to determine the probability of an occurrence of a triggering of the feature game, based on the probability determining data and the bet data.

Then, also, preferably, the CPU is adapted to determine the probability of an occurrence of a triggering of the feature game, based on the probability determining data and the bet data.

In a preferred embodiment of the invention, the CPU is adapted to determine whether a triggering of the feature game is to occur based on a number generated by the random number generator and said probability of an occurrence of a triggering of the feature game.

In a preferred embodiment of the invention, the CPU, if it has determined that a triggering of the feature game is to occur, is adapted to determine, based at least partly on the trigger data, an award that is to be made following said triggering.

In a preferred embodiment of the invention, the CPU, if it has determined that a triggering of the feature game is to occur, is adapted to determine, based at least partly on the bet data, an award that is to be made following said triggering.

In a preferred embodiment of the invention, the or at least one of the more than one gaming table has more than one players position, the CPU, if it has determined that a triggering of the feature game is to occur, is further adapted to determine, based at least partly on the trigger data, to which one or more of the player positions an award is to be made following said triggering.

According to a second aspect of the invention there is provided a method of gaming, the method including:

A. providing apparatus for playing a feature game during the playing of a table game by one or more players, the table game having predetermined table game winning criteria, the apparatus including at least one gaming table for playing a table game, the or each gaming table having one or a plurality of predetermined player positions, wherein, when the gaming table has one player position, that position is a position for the playing of the feature game and table game by at least one player, and when the gaming table has a plurality of player positions, each position of said a plurality of player positions is a position for the playing of the feature game and table game by a respective at least one player; and a gaming computer system, the computer system including a bet data receiving component, a temporary memory, a programmable unit, including trigger data representing feature game triggering criteria which differ from the table game winning criteria and eligibility data representing eligibility criteria which are to be satisfied before the feature game can be triggered, and a CPU, B. enabling the placing of at least one position wager consisting of at least one bet at the or each player position by the respective one or each respective one of the at least one player, the position wager including at least a table game portion for playing the associated table game and at least a feature portion;

C. receiving, by means of the bet data receiving component, respective bet data in relation to the or each player position, the bet data representing an identity of that player position and representing a quantum of the or each feature portion of the or each position wager placed at that player position by the or each player playing at that position;

D. storing the bet data received by the bet data receiving component in the temporary memory;

E. determining, with the CPU, feature game triggering criteria of the apparatus, and provided the feature game can be triggered based on the eligibility criteria being satisfied and provided the feature game triggering criteria determined by the CPU are satisfied, determining, with the CPU, based on the trigger data, to which of the player positions a feature game award is to be made and the quantum of that award.

In a preferred embodiment of the invention, in step A, the computer system includes a random number generator, the method including:

before step E, triggering a random number with the random number generator;

in step E, determining, with the CPU whether the generated random number satisfies the feature game triggering criteria of the apparatus; and provided the feature game can be triggered based on the eligibility criteria being satisfied, and provided the random number satisfies the feature game triggering criteria, determining, with the CPU, based on the trigger data, to which of the player positions a feature game award is to be made and the quantum of that award In a preferred embodiment of the invention, in step G, if the generated random number satisfies feature game triggering criteria, determining, with the CPU, based on the trigger data, and if there is a plurality of players at at least one of the respective player positions, to which of the players at said at least one of the respective player positions a feature game award is to be made and the quantum of that award.

In a preferred embodiment of the invention, in step C, the method includes receiving, by the bet data receiving component, respective bet data from bet detection apparatus which is adapted to automatically detect the or each player position and the quantum of the or each position wager placed at the respective position.

In a preferred embodiment of the invention, step F includes determining with the CPU, whether the generated random number satisfies feature game triggering criteria to enable the triggering of the feature game, based on bet data that has been received by the bet data receiving component.

In a preferred embodiment of the invention, step G includes determining with the CPU, a quantum of an award to be made as part of the feature game based on bet data that has been received by the bet data receiving component.

BRIEF DESCRIPTION OF THE DRAWINGS

Preferred embodiments of the invention will now be described, by way of example only, with reference to the accompanying drawings in which.

DETAILED DESCRIPTION

This invention relates to the playing of a table game, and the parallel playing of an associated feature game.

Figure 1:
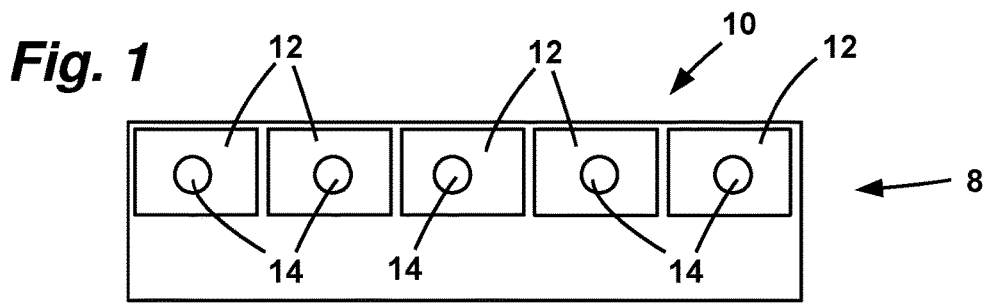
FIG. 1 is a schematic plan view of a gaming table forming part of a gaming apparatus according to an embodiment of the invention.

Referring to FIG. 1, there is shown a gaming table 10 for playing a table game, the table forming part of a gaming apparatus, generally referenced 8. The table 10, according to an embodiment of the present invention, has a number of demarcated player positions 12 each adapted for being associated with a respective one of a number of players (not shown) for enabling the players to place respective bets 14 at the respective positions. In other embodiments, the gaming apparatus may include additional gaming tables (not shown) or an alternative gaming table to the table 10.

Examples of table games for which the table 10 or similar tables may be adapted are Blackjack, Roulette, Baccarat, Sic Bo and Money Wheels, although this is not a closed list of table games for which such table may be used.

The table game for which the gaming table 10 is used has a set of rules for the playing of the table game, for setting criteria by which each player of the table game may achieve a winning outcome of that game, and for determining the nature of such winning outcomes.

As in the prior art, a winning outcome based on the table game rules may be based on winning patterns or combinations of, say, playing cards, or other specific outcomes. For example, a winning outcome may involve the awarding to the player of a multiple of the bet placed at that player's position 12 at the gaming table 10.

For example, where the table game involves the game of Roulette, winning awards can involve different multiples of the initial bet placed at the player's position 12 depending on the type of bet 14 placed, for example a bet placed on a single number on a Roulette wheel or on a set of numbers, the type of number, or the colour of the number on which the bet is placed.

In a different example, where the table game involves the game of Blackjack, a player wins by being dealt a combination of cards, by a dealer, with a total value of the cards dealt to the player not exceeding the number 21, but where that total exceeds the total value of the cards that the dealer deals to him- or herself ("dealer's cards"), or where the total value of the player's cards does not exceed the number 21, but the total value of the dealer's cards does exceed 21.

The bets 14 placed by players at the player positions 12 may be in different forms, such as actual money; tokens (gaming chips) having different monetary values depending on the nature, colours and designs of the chips; credits; loyalty points; or other forms of bet, depending on the facilities and rules at the particular gaming establishment at which the game is played.

It will be appreciated that, depending on the type of bets 14 in question, the bets may include physical items placed at the players' positions 12 (such as money or chips), or electronically designated values or "virtual" items.

An important issue is that each bet 14 is associated with a particular player position 12, whether it be a physical position at a physical gaming table such as the table 10, a non-physical position associated with a physical table or a non-physical (virtual) position at a non-physical (virtual) table.

Depending on the embodiment, when the player or players place bets 14 for the one or more table games:
- separate bets are placed for the feature game, or
- portions of the table game bets are allocated to the feature game (for example predetermined percentages of those placed bets), or
- the whole of the bets placed for the one or more table games are considered by the gaming apparatus to be allocated to the feature game.

The outcome of the feature game is at least partly based on the bet or bet portion that is (or is considered to be) allocated to the feature game.

Figure 2:
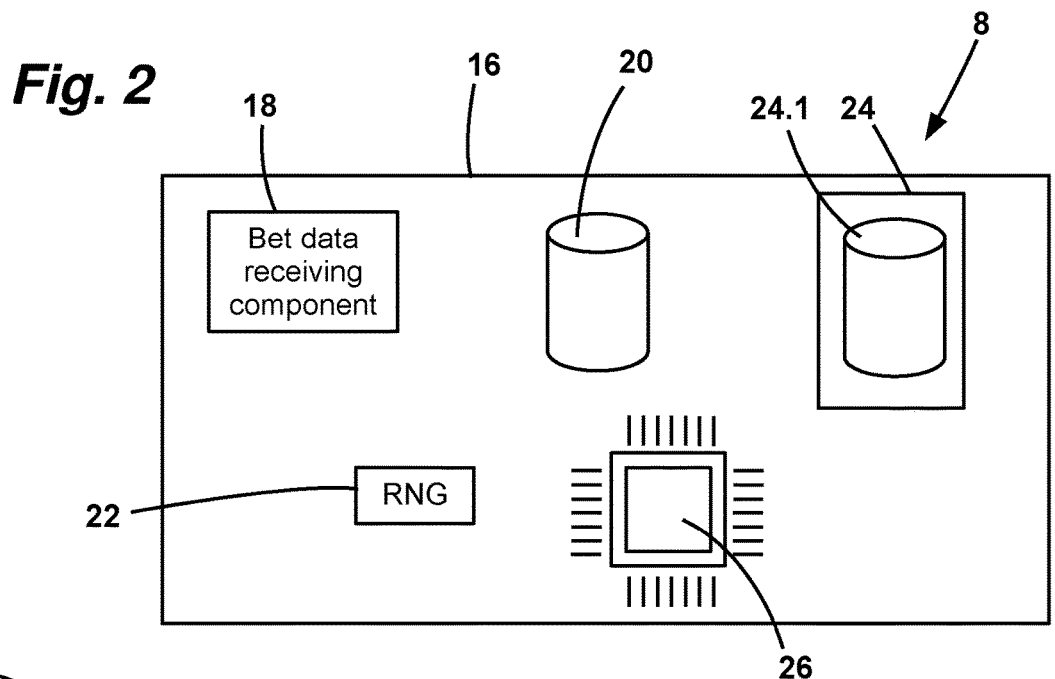
FIG. 2 is a diagrammatic representation of a gaming computer system forming part of the gaming apparatus of FIG. 1, according to an embodiment of the invention.

According to an embodiment of the invention, there is provided a gaming computer system 16 associated with the gaming table 10, the computer system being schematically shown in FIG. 2. The computer system 16 includes a bet data receiving component 18, a temporary memory 20, a random number generator 22, a programmable unit 24, and a central processing unit (CPU) 26. The temporary memory 20, programmable unit 24 and CPU 26 form part of a decision making module, generally referenced 28, of the gaming apparatus.

Entering of Data, and Bet Data Receiving Component

At the start of a table game a bet 14 is placed by a player associated with a particular player position 12, or by a plurality of players associated with that player position, or by a plurality of players associated with a plurality of particular player positions.

Bets 14 can be placed in a number of different ways depending on how the gaming apparatus 8 is set up, designed or configured.

For example, a bet 14 can be placed by placing actual money or gaming chips in the relevant player positions 12, according to the amounts desired to be wagered by the respective players.

According to one simple example, details of such bets 14, including the values of the bets, and the player positions 12 at which the bets are placed, can be manually entered into the bet data receiving component 18 by means of a keyboard or number pad (not shown) which forms part of, or is connected to, the bet data receiving component.

Alternatively, the bet data can be captured by means of one or more camera (not shown) and suitable analysis software and hardware for recognising bets 14 in the form of monetary denominations, or values of different gaming chips based on their colours or other markings or numbers appearing on them, and also the player positions 12 at which the money or chips are placed as bets. Such cameras and hardware, including hardware for running the software, can be connected to, or form part of, or otherwise be operatively associated with, the bet data receiving component 18.

As yet another alternative, where the bets 14 are placed in the form of gaming chips, there may be provided suitable signal transmitting components (not shown) within or on the chips such as RFID transmitters. There can also be provided receivers (not shown), such as RFID receivers, disposed on or near to the gaming table 10, for receiving relevant data from the signal transmitting components. Such receivers may be connected to, form part of, or otherwise be operatively associated with, the bet data receiving component 18.

Thus, signals representing the values of the chips can be sent by such transmitters, and these signals can be received by the receivers which can also be positioned and configured to determine the player positions at which the respective chips whose signals are being received at any one time are located. In this manner, the bet data receiving component 18 can receive data representing the values of such chips and the player positions at which such chips are placed.

In other embodiments, bets 14 can be in other forms, such as credits or loyalty points accrued by players at the gaming establishment where the game is played. In this case, the data relating to the size of the bets wagered and player positions 12 can be entered by suitable interfaces (not shown) such as keyboards, number pads, swipe cards, RFID tags, or the like, or combinations of such interfaces, and in this manner provided or transmitted to the data receiving component 18.

According to another embodiment, another manner of entering data representing the size of the bets 14 wagered and player positions 12, and providing this data to the data receiving component 18, is by portable wireless devices such as smart phones.

In such cases, the bet may be electronic symbols representative of physical bet items such as actual money or chips, that is, virtual money or virtual chips.

Also, while the gaming table 10 and player positions 12 are described above as physical objects, demarcations or the like, in other embodiments, they may be virtual in nature, for example a computerised image or representation of a gaming table and player positions at that table, or computerised representations of player positions at a physical table.

This data representing the bets 14 and relevant player positions 12, once entered, is stored in the temporary memory 20.

The amount bet may include a single bet amount per player position 12, in which case, in a preferred embodiment, the whole bet is considered not just as a bet in relation to the table game with which the gaming table 10 is associated, but also as a bet in relation to the feature game.

As an alternative, each bet 14 may include two wagered amounts, one being for the table game and the other being allocated to the feature game. Where such bets are in the form of physical items such as actual money or chips, according to one preferred embodiment, there are two zones (not shown) at each player position 12, one zone at each player position 12 being for placement of the bet relating to the table game and the other zone at each player position being for placement of the bet relating to the feature game.

In another embodiment, where a single bet is made, part of the data input (programmed) into the programmable unit 24 includes rules for determining which portion of each bet is to be allocated to the table game and which to the feature game.

Data Stored in the Programmable Unit

The programmable unit 24 includes data memory 24.1 in which trigger data has been pre-programmed or saved, the trigger data representing feature game triggering and winning criteria. Keeping in mind that the feature game is a game that is separate from, but played in parallel with, the table game, it will be understood that the winning criteria for the feature game differ from those which apply according to the rules of the particular table game associated with the gaming table.

The data memory 24.1 of the programmable unit 24 also holds eligibility data representing eligibility criteria, which are for determining whether each bet placed at each player position 12 of the table game (or the portion of the bet that is allocated to or designated for the feature game), meets predetermined eligibility requirements for triggering the feature game, or participation in, or sharing in, the award of the feature game. In its simplest form, the eligibility requirements may be a non-zero bet amount for the feature game. In other embodiments, other eligibility requirements may apply, such as minimum bet values.

The data memory 24.1 of the programmable unit 24 also holds either probability data or probability determining data, for representing or determining a probability of triggering the feature game.

Where the data memory 24.1 of the programmable unit 24 has probability data saved in it, according to one embodiment, this data, which has been pre-programmed or saved in the data memory, sets a fixed probability of a feature game being triggered.

Where the data memory 24.1 of the programmable unit 24 includes probability determining data, according to one embodiment, this data, which has been pre-programmed or saved in the data memory, can be used in conjunction with the bet data to calculate the probability of the feature game being triggered. For example, the probability determining data may be set to determine a particular probability of a feature game being triggered where the average amount bet, across the various player positions, and designated for the feature game, is at least a pre-determined minimum value.

Alternatively, by way of further example, the probability determining data may be set to determine different probabilities based on the particular range, of a group of possible ranges, in which the average amount bet, across the various player positions, falls.

CPU Calculations

The calculations of probabilities mentioned above are carried out by the CPU 26, and are further used as described below.

The random number generator 22 can generate a random number, which is used to determine, based on a particular applicable probability of winning, whether the feature game will be triggered. Ways of determining whether the feature game will be triggered based on the determined probability and generated random number, will be understood by those skilled in the art, but are discussed by reference to examples below.

CPU Calculations—Probabilities

For example, say the probability is determined to be 20%, then one way in which the determination of whether the feature game will be triggered is illustrated by the following example. Twenty numbers (say 1 to 20) may be selected from 100 available numbers (say 1 to 100). The random number generator is adapted to generate a random number in the range from 1 to 100. The prospect of the random number generator generating a number in the selected range from 1 to 20 from the available range of 1 to 100, is 20%. Thus, the decision making module 28 may be configured such that, if the random number generator generates a number in the range from 1 to 20 (for which there is a 20% probability), the feature game will be triggered.

If the CPU 26 determines, based on the above process, that a triggering of the feature game is to occur, the CPU may be further adapted to determine, based at least partly on the trigger data, an award (i.e. the type and value of the award) that is to be made following the triggering of the feature game.

According to a preferred embodiment, the CPU 26 is adapted, when determining the award based on the trigger data, to also take into account as part of the determination, the bet data. For example, the game winning criteria may involve rules according to which the award quantum is based on the average bet amount, across the various player positions 12, designated for the feature game.

Once the CPU 26 has determined that a triggering of the feature game is to occur and has determined what that award is as described above, it is further adapted to determine, based at least partly on the trigger data, to which one or more of the player positions 12 the award is to be made following the triggering of the feature game.

According to a preferred embodiment, the CPU 26 is adapted, when determining to which player position 12 or positions the award is to be allocated, to also take into account as part of the determination, the bet data. For example, the game winning criteria may involve rules according to which the award is allocated to (i.e. shared between) those player positions 12 at which certain minimum values of bets, designated for the feature game, were placed. In this case, the award may be allocated to those winning player positions 12 in proportion to the actual bet amounts at those positions.

From the above, it will be appreciated that there may be a single prize awarded or a number of different prizes.

CPU Calculations—Winning Probability Related to Bet Size

While the previous embodiment relates to assessing the probability of the feature game being triggered, the prize to be awarded, and the player position or positions to which the prize is to be awarded (or shared) across a number of different player positions 12, according to another embodiment, referred to below as a "discrete determination embodiment", this is not carried out across a number of player positions, but is a process applied for each player position separately.

In this case, by way of example, after the bets are placed and the opportunity for further bets has been closed, the above-mentioned calculations of the CPU 26 (other than those relating to allocations between players) are performed for each of the player positions 12.

Thus, if one of the player positions 12 is identified as position 1, the decision making module 28 applies a multiplier based on the bet placed at position 1 to the probability of triggering the feature game. If it is triggered, then the prize is determined as described above. However, in this case, instead of the CPU 12 determining, based at least partly on the trigger data, to which one or more of the player positions 12 the award is to be made following the triggering of the feature game, rather, the prize is awarded to the position that triggered the particular occurrence of the feature game—which in this case is position 1.

This same process is repeated for every eligible player position 12. In this case, the same probability criteria and prize determining criteria are applied to each of the winning player positions 12. For example, the probability of determining whether a respective feature game will be triggered for each of the eligible player positions 12 may be based on a multiplier which is applied to the bets (or portions of the bets allocated to the feature games) at each of the positions. Thus, if a bet is placed at a first player position 12 which is twice the bet placed at a second player position, then even though the above-mentioned procedure of the CPU 12 is applied separately in relation to those two bets, the bet at the first position will result in the probability of a feature game being triggered for that position being twice the probability of a feature game being triggered at the second position.

CPU Calculations—Winning Quantum Relating to Size of the Bet

As an alternative to the probabilities of respective feature games being triggered based on the relative sizes of bets placed at the different player positions 12, the bets (or portions thereof allocated to the feature games) may instead be used as multipliers applied to certain fixed award amounts. In this case, the feature game prizes awarded to different player positions 12 are proportional in size to the size of the bets (or relevant portions thereof) placed at those positions, while the probability of triggering the feature game for all of the player positions is the same.

Hybrid Embodiment

A further embodiment involves a hybrid of the embodiment where the size of the bet amount affects the probability of the feature game being triggered, and the embodiment where the size of the bet amount affects the prize allocated once the feature game has been triggered.

In this hybrid embodiment, the apparatus 10 may employ two probability tables, one for determining a probability of the feature game being triggered, and the other for determining a probability of different prizes being won.

Also, the random number generator 22 may be adapted to generate a random number for use with the first probability table and another random feature number for use with the second probability table. Indeed, in another embodiment, separate random number generators may be provided for generating these two numbers.

This may be described with reference to different categories of prizes, referred to as levels of prizes. Thus, according to one example, there are four levels of prize, being levels 1, 2, 3 and 4. According to this example, prize levels 1 and 2 relate to prizes awarded on a feature game where the bet size affects the probability of the feature game being triggered but not the sizes of the prizes awarded. On the other hand, prize levels 3 and 4 relate to prizes awarded on a feature game where the bet size does not affect the probability of the feature game being triggered, but rather affects the size of the prizes awarded. More specific examples are provided below.

Two-Stage Process

As discussed in further detail below, the operation of the gaming apparatus 8 and the running of the table game and feature game according to a preferred embodiment of the present invention involve a two stage process, which is performed by the decision making module 28.

In summary, this two-stage process involves a first stage, stage 1, of determining whether a prize is to be awarded and determining the prize that is to be awarded.

These stages are described in detail below with reference to the flow diagram 30 of FIG. 3.

The gaming apparatus according to an embodiment of the invention operates as follows.

Closing of Bets and Game Commencement

Once all bets to be placed have been placed, this can be recognised either by a person, such as a dealer or croupier, manually entering a signal into the computer system 16 to this effect, for example by means of a suitable controller (not shown), or by the computer system itself, where it is configured to recognise bets visually or by other signals such as RFID.

At that stage, no further bets will be accepted by the gaming apparatus 8 including the bet data receiving component 18, and the table game begins.

In one preferred embodiment, once the operation of the table game has begun, the performance of the feature game is independent of the performance of the table game with which the feature game is associated, although the feature game runs in parallel with the table game.

The start of the table game also constitutes the start of stage 1 of the feature game.

The CPU 26 carries out its calculations and determining functions as described above.

If the second stage is not triggered, then play of the table game continues in its normal manner.

If the second stage is triggered, the CPU 26 determines the value of the bet 14 at each of the player positions 12 at which bets have been placed which are determined by the CPU to be eligible for winning the feature game. This is according to the eligibility rules programmed into the programmable unit 24.

Where separate amounts have been bet on the table game and on the feature game, or where separate portions of single amounts at the player positions 12 are allocated to the table game and feature game, then it is the amount bet on, or allocated to, the feature game that is considered by the CPU 12 in this regard.

Based on the information regarding the values of the bets 14 placed or allocated to the feature game, the CPU 26 determines the appropriate amount of the prize to be awarded, if any, to each player position. If there is more than one player at a particular player position to which a prize is awarded, and if those players have placed their own separate bets, then according to one preferred embodiment, the computer system 16 is adapted to identify those bets and save data relating to them, and to share the prize awarded to that player position among those players in proportion to their respective bets.

According to another embodiment, the decision making module 28 is programmed to initiate stage 1 a predetermined time after the table game is begun. In this case, if the outcome of stage 1 is to proceed with stage 2 (i.e. if there is to be a triggering of the feature game), in this case too, the decision making module 28 will use the information relating to current eligible bets to perform stage 2. Stage 2 may, for example use a different random (feature) number to the random number used in stage 1.

In yet another embodiment, stage 1 is initiated according to a rule other than a predetermined time after the table game is begun.

Details of Two-Stage Process and Other Game Steps

Figure 3:
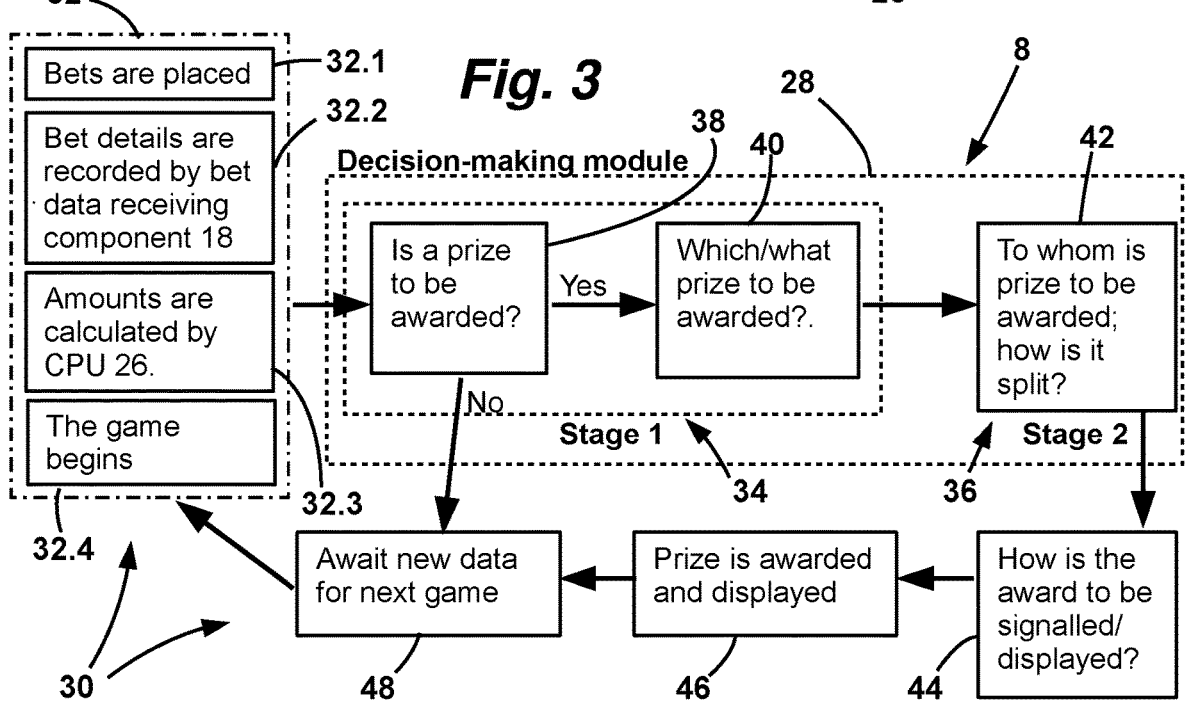
FIG. 3 is a block diagram representing a sequence of steps in the playing of a table game and feature game, including a two-stage decision making process performed by a decision making module forming part of the gaming apparatus of FIG. 1.

Reference is now made to FIG. 3 which shows a flow diagram 30 representing steps during the process of a feature game which, according to the invention, is played in parallel with the playing of a table game.

In the flow diagram 30, an initial group of steps in the process of playing the table game and feature game is represented at 32. This group of steps as represented involves the placing of bets by players, as represented as 32.1, recording details of the bets (such as amounts, portions allocated to the feature game, gaming position 12, and so on) by the bet data receiving component 18 as represented as 32.2, the required calculations by the CPU 26 for determining bet amounts, as represented as 32.3, and the commencement of the game play as represented as 32.4.

After the first group of steps 32, the next steps as represented are carried out by the decision making module 28.

As can be seen, the steps carried out by the decision making module 28 take place as part of a two-stage process, being stage 1, indicated at 34, and stage 2, indicated at 36.

Stage 1 at 34 itself includes two steps, wherein a first of these steps, indicated at 38, involves the determination of whether a prize is to be awarded. This, in turn, involves the process described above in which the CPU 26 determines whether the feature game is to be triggered based on a predetermined or determined probability and the number generated by the random number generator 22, and may take into consideration the bet data.

If it is determined in step 38 that a prize is to be awarded (indicated by the word "yes" in the flow diagram 30), the second step, indicated at 40, of Stage 1 at 34, is initiated. This step 40 involves the determination of the prize that is to be awarded. This, in turn, involves the process described above in which the CPU 26 determines an award (i.e. the type and value of the award) that is to be made following the triggering of the feature game, which, as described above, may take into account the bet data.

Stage 2, at 36 involves the step, indicated at 42, of determining to which player position or player positions (and hence to which players) the prize or a portion of the overall prize, is awarded. This, in turn, involves the process described above in which the CPU 26 determines to which one or more of the player positions 12 the award is to be made following the triggering of the feature game.

After stage 2, the decision making module 28 has completed its task, and the next step in the process of playing of the game, as indicated at 44, occurs. This is the step of determining how the outcome of stage 2 (namely the awarding of a prize and allocation of the prize or portions of the prize to one or more player position 12) is to be signalled or displayed to the players at the gaming table. Such signalling or displaying can be carried out visually, aurally, or tactilely.

Following the step indicated at 44, the next step indicated at 46 occurs. This involves the actual awarding of the prize or portions of the overall prize to the players associated with the winning player positions 12. The awarding of the prize is carried out in a conventional manner as would be understood by those skilled in the art, for example by making physical cash payouts to the winning players, by allocating credits electronically to the players, etc.

According to a preferred embodiment, the awarding of the prize for the feature game is carried out contemporaneously with the awarding of prizes, if any, in relation to the table game associated with the gaming table 10 and in parallel with which the feature game is played.

After that step indicated at 46, which also represents that the table game is completed, the game process can begin again in the step indicated at 48, in which the gaming apparatus 8, and in particular the bet data receiving component 18, is readied for receiving bet data for another successive table game and parallel feature game.

As can be seen from the flow diagram 30, at the first step 38 of stage 1, at 34, as performed by the decision making module 28, if the outcome of that step is that it is not determined that a prize is to be awarded (as indicated by the word "no" in the flow diagram 30), then the process jumps immediately to the step 48, with the steps 40 to 46 being omitted.

EXAMPLES

The following are examples demonstrating differing award outcomes made at different player positions based on the amounts, at those positions, that have been bet in relation to, or allocated to, the feature game.

Example 1

A $10 bet is placed at player position A (not shown) which serves as a bet on the feature game. This amount is considered to render that position eligible for an award as part of the feature game. A $5 bet is placed at player position B (not shown) which serves as a bet on the feature game. This amount is also considered to render that position eligible for an award as part of the feature game. In this example, as a result of the $10 bet being twice the value of the $5 bet, the chance of a prize being awarded to player position A is double the chance of a prize being awarded to player position B.

Example 2

The same bets are made as in Example 1. However, in this example, a $10 bet is placed at player position A which serves as a bet on the table game but this amount is also considered to render that position eligible for an award as part of the feature game. A $5 bet is placed at player position B which serves as a bet on the table game but this amount is also considered to render that position eligible for an award as part of the feature game.

Example 3

The same bets are made as in Example 1. However, in this example, player position A and player position B are each awarded a share of a prize, but in light of the differing values of the bets at the two player positions, the portion of the prize awarded to player position A is twice that awarded to player position B.

Example 4

There are two players at a Blackjack table, player 1 and player 2, each player having (and therefore being associated with) a respective player position at the table. The players each place their ordinary bets for the blackjack game as well as a $1 bet to render their player position eligible to win a feature game in the form of a progressive jackpot prize.

Data relating to the bets is received by the bet data receiving component 18 of the gaming apparatus 8 in one of the manners described above, depending on the particular features and configuration of the gaming apparatus.

Once these bets are placed, no more bets are accepted by the gaming apparatus 8 and the game starts. The decision making module calculates that the prize will be awarded (i.e. that stage 1, at 34, is to have an outcome suitable to initiate stage 2, at 36) based on data saved in the programmable unit 24. The decision making module 28 then determines that the prize is to be awarded to player 1.

Signals are sent from the decision making module 28 to displays (not shown) of the gaming apparatus 8 and other award providing modules (not shown) also forming part of the gaming apparatus, to award the jackpot prize to player 1.

In this example, while player 1 wins the jackpot prize (i.e. the feature game), neither of the players has a winning combination according to the game rules of Blackjack.

Example 5

There are 3 players at a casino, player 1, player 2 and player 3. Player 1 and player 2 are at a blackjack table (not shown), while player 3 is at a roulette table (also not shown).

The players each place their bets on their respective games. Player 1 and player 3 each place a $1 bet in order for their player positions to be eligible to win a progressive jackpot prize.

Data relating to the bets is received by the bet data receiving component 18 of the gaming apparatus 8 in one of the manners described above, depending on the particular features and configuration of the gaming apparatus. According to a preferred embodiment of this example, the decision making module 28 is adapted to carry out the determination of whether feature games are to be awarded, and the nature and allocation of award according to the discrete determination embodiment discussed above.

Once these bets are placed, no more bets are accepted by the gaming apparatus 8 and both the blackjack and roulette games start.

The decision making module 28 calculates that a prize will be awarded (i.e. that stage 1, at 34, is to have a potentially winning outcome, to initiate stage 2, at 36) based on data saved in the programmable unit 24. The decision making module 28 then determines that the prize is to be awarded to player 3.

Signals are sent from the decision making module 28 to displays (not shown) of the gaming apparatus 8 and other award providing modules (not shown) also forming part of the gaming apparatus, to award the jackpot prize to player 3.

Neither player 1 nor player 2 has a winning hand or combination according to the game rules of their respective game. Player 3 does have a winning hand according to the rules of player 3's game (Roulette) and is paid out for that win according to the game rules of Roulette. Thus, in this example, player 3 wins both the table game and the feature game.

The second selection process can be unseen by the player or players or could be depicted to the player or players through some other means such as an animation sequence or audio sequence.

Example 6

This example relates to the hybrid embodiment referred to above.

In this example, the game involves a three-level prize feature game, where the basic probability of the feature game being triggered is independent of the sizes of bets placed, but where, once the feature game is triggered, the probability of a particular prize being awarded may be dependent on the bet size for certain prizes, but not for other prizes.

However, it will be understood that, once the feature game has been triggered, one of the various levels of prize will be awarded. Thus, once the feature game has been triggered, there is a 100% probability that one of the different levels of prize will be awarded even though different probabilities may apply to the specific levels of prizes, where these probabilities may or may not be based on the sizes of the bets.

The determination of the probability of the feature game being triggered is achieved by the decision making module 28 using a first probability table with a randomly generated number, while, for those levels of prize whose probability of being won is based on the size of the bet, the decision making module uses a second probability table with a another randomly generated feature number.

According to this example there is a 1/100 (1%) probability of the feature game being triggered, and once triggered the three levels of prize become available as follows:

a Level 1 prize of $1,000,
a level 2 prize of $10, and
a level 3 prize of $0—i.e. a null prize.
If a $1 bet is placed, then
the probability of winning the Level 1 prize of $1,000 is 1/5 (20%);
the probability of winning the Level 2 prize of $10 is 1/5 (20%); and
the probability of winning the Level 3 prize of $0 (a null prize) is 3/5 (60%).
If a $2 bet is placed, then
the probability of winning the Level 1 prize of $1,000 increases to 2/5 (40%),
the probability of winning the Level 2 prize remains 1/5 (20%) but the prize amount increases to $20 (in proportion to the increased size of bet), and
the probability of winning the Level 3 prize of $0 (a null prize) is adjusted to 2/5 (40%) to accommodate the changed probability of winning the Level 1 prize.
If a $3 bet is placed, then
the probability of winning the Level 1 prize of $1,000 increases to 3/5 (60%),
the probability of winning the Level 2 prize remains 1/5 (20%) but the prize amount increases to $30 (in proportion to the increased size of bet), and
the probability of winning the Level 3 prize of $0 (a null prize) is adjusted to 1/5 (20%) to accommodate the changed probability of winning the Level 1 prize.

Summary of Embodiments of the Invention

In summary, embodiments of the present invention involve a gaming apparatus and method of using a gaming apparatus, which involve the playing of one or more table games by one or more players, and the playing of a feature game in parallel with (during) the playing of the one or more table games. The outcome of the feature game is independent of the outcome of the one or more table games, and is partly based on data and criteria that have been pre-programmed into the gaming apparatus. The outcome of the feature game may also be based on the nature of bets placed by different players.

An important feature of the invention is that the gaming apparatus includes bet data receiving means which is adapted to receive respective bet data in relation to each player position, where the bet data represents the identity of the relevant player position and the wager or wagers placed at that player position by the respective player or players.

Options in Different Embodiments

According to different embodiments, the use of the gaming apparatus 8 involves different features or combinations of features, examples of which are as follows.

The feature game prize may be a jackpot or progressive prize.

A successful outcome of stage 1, at 34, may involve a specific sound to be generated by the apparatus to alert a player that the player is about to enter stage 2, at 36.

A successful outcome of stage 1 may involve the presenting of a visual feature to alert a player that the player is about to enter stage 2.

A successful outcome of stage 1 may involve the actuation of a tactile feature to alert a player that the player is about to enter stage 2.

The feature game may be payable and operable over a group of different gaming tables, where such group of tables is provided for the playing of one particular table game or different table games.

Where an alert is generated to alert a player that the player is about to enter stage 2, or for any other purpose, e.g. that the player has actually been awarded a prize, where this alert includes the generation of a sound, visual effect, or tactile feature, these alerts may be generated by apparatus (not shown) separate from, and ancillary to, the gaming apparatus or at least to the gaming table—for example external audio equipment (for aural alerts), overhead signage (for visual alerts), a vibrating chair (for tactile alerts), and so on. An advantage of using such separate or ancillary equipment is that it can provide entertainment value not just to the players of the table game or games themselves, but to others, such as players of other games and spectators.

In different embodiments, the specific ones of combinations of the above features can be used Although the invention is described above in relation to specific embodiments, it is to be understood that it is not limited to those embodiments, but may be embodied in other forms, falling within the scope of, and limited only by, the claims.

For example, while embodiments are described above in relation to a two-stage process for effecting the feature game, it may be performed as a single stage, or more than two stages.

The invention claimed is:

1. A gaming apparatus for playing at least part of a feature game during the playing of a table game, the table game having predetermined table game winning criteria, the apparatus including:
    a gaming table having a plurality of predetermined player positions for playing of the feature game and table game by a plurality of players; and
    a gaming computer system, the computer system including
        a bet data receiving component,
        a temporary memory,
        a programmable unit adapted to be programmed with trigger data and eligibility data, and
        a CPU,
    wherein
        each player position of said plurality of predetermined player positions is adapted for one or more player of said plurality of players, that is playing at the respective player position, each to place a respective position wager at, so as to be associated with, the respective player position, wherein at least a portion of the respective position wager is a table game allocated for playing the table game and at least a portion of the respective position wager is a feature game allocation allocated for playing the feature game;
        the bet data receiving component is adapted to receive respective bet data in relation to each player position of said plurality of predetermined player positions at, or in association with which, said one or more player has placed a respective wager, wherein, for each of the respective player positions for which the bet data is received, the respective bet data represents an identification of the respective player position and a quantum of the respective feature game allocation, if any, of each position wager placed at, or so as to be associated with, the respective player position by each player of the plurality of players playing at that position;
        the temporary memory is adapted to store the bet data received by the bet data receiving component;
        the CPU is adapted to determine, based at least partly on said trigger data, feature game triggering criteria, and to determine, based at least partly on the triggering criteria, and independent of play of the table game after initiation thereof and of each outcome of the table game, whether the feature game is to be triggered to run in relation to any player position of said plurality of predetermined player positions, and for each player position of the plurality of predetermined player positions for which the CPU determines that the feature game is to be triggered to run, to trigger the running of the feature game such that it runs at least partly contemporaneously with play of the table game, and
        the CPU is adapted to determine, based at least partly on said eligibility data, and independent of play of the table game after initiation thereof and of each outcome of the table game, whether each player position of the plurality of predetermined player positions for which the CPU determines that the feature game is to be triggered to run, is an eligible position being a position that is eligible to receive a feature game award on a winning occurrence, for the respective position, of the feature game.

2. A gaming apparatus according to claim 1 wherein the computer system is adapted to trigger an outcome randomly selected from a plurality of predetermined possible outcomes; and
    the CPU is adapted to determine, based partly on the triggered outcome, whether the feature game is to be triggered to run in relation to any player position of said plurality of predetermined player positions.

3. A gaming apparatus according to claim 2 wherein the trigger data includes probability determining data to be used by the gaming apparatus in determining a probability of an occurrence of a winning outcome of the feature game, and the CPU is adapted to determine whether a winning outcome of the feature game is to occur based on a random number generated by the random number generator and on said probability of an occurrence of a winning outcome of the feature game.

4. A gaming apparatus according to claim 1, wherein each player position of said plurality of predetermined player positions is adapted for more than one player of said plurality of players to play at the respective player position, and for each of the players playing at the respective player position to place a respective position wager at, or so as to be associated with, the respective player position, wherein at least a portion of the respective position wager is a table game allocation allocated for playing the table game and at least a portion of the wager is a feature game allocation allocated for playing the feature game,
    the bet data receiving component being adapted to receive said bet data in relation to each of the respective position wagers placed by each of the players playing at the respective player position, the bet data representing, for each of the players at the respective player position, an identification of the respective player position and a quantum of the feature game allocation, if any, placed by the respective player.

5. A gaming apparatus according to claim 1 wherein the bet data receiving component is adapted to receive said bet data from bet detection apparatus which is adapted to automatically detect each player position and a quantum of each feature game allocation of each position wager placed at the respective position.

6. A gaming apparatus according to claim 5 wherein the bet detection apparatus includes one or more optical detection component.

7. A gaming apparatus according to claim 5 wherein the bet detection apparatus includes at least one camera.

8. A gaming apparatus according to claim 5 wherein the bet detection apparatus includes at least one Radio-frequency identification (RFID) receiver.

9. A gaming apparatus according to claim 5 wherein the bet detection apparatus includes at least one mobile telephone receiver adapted to receive data from remote mobile telephone devices.

10. A gaming apparatus according to claim 1 wherein the CPU is adapted to determine whether the feature game is to be triggered to run in relation to any player position of said plurality of predetermined player positions, and
an award, if any, to be made to each player position of the plurality of predetermined player positions for which the CPU determines that the feature game is to be triggered to run based partly on the bet data that has been received by the bet data receiving component.

11. A gaming apparatus according to claim 1 including a plurality of said gaming tables.

12. A gaming apparatus according to claim 11 wherein the plurality of gaming tables are adapted for playing a plurality of associated different types of table game.

13. A gaming apparatus according to claim 1 wherein the CPU is adapted to determine that each player position of the plurality of predetermined player positions for which the CPU determines that the feature game is to be triggered to run, is an eligible position, when the respective feature game allocation of the position wager, if any, placed at, or so as to be associated with, the respective player position exceeds a predetermined threshold amount represented by the eligibility data.

14. A gaming apparatus according to claim 1 wherein the trigger data includes probability data representing a probability of an occurrence of a winning outcome of the feature game.

15. A gaming apparatus according to claim 1 wherein the trigger data includes probability determining data to be used by the gaming apparatus in determining a probability of an occurrence of a winning outcome of the feature game.

16. A gaming apparatus according to claim 15 wherein the gaming apparatus is adapted to determine the probability of an occurrence of a winning outcome of the feature game using both the probability determining data and the bet data.

17. A gaming apparatus according to claim 15 wherein the CPU is adapted to determine the probability of an occurrence of a winning outcome of the feature game using both the probability determining data and the bet data.

18. A gaming apparatus according to claim 1 wherein the CPU, for each respective player position of said plurality of predetermined player positions that it has determined is an eligible position is adapted to determine, based at least partly on the eligibility data, a quantum of the respective feature game-award.

19. A gaming apparatus according to claim 1 wherein the CPU, for each respective player position of said plurality of player positions that it has determined is an eligible position, is adapted to determine, based at least partly on the bet data, a quantum of the respective feature game-award.

20. A gaming apparatus according to claim 1 including a random number generator and wherein the CPU is adapted to determine, based partly on a number generated by the random number generator, whether the feature game is to be triggered to run in relation to any player position of said plurality of predetermined player positions.

21. A gaming apparatus according to claim 1 wherein the CPU is adapted to determine, based at least partly on the triggering criteria, and independent of play of the table game after initiation thereof and of each outcome of the table game, whether the feature game is to be triggered to run, and if the CPU determines that the feature game is to be triggered to run, to trigger the running of the feature game for all player positions of the plurality of predetermined player positions, such that it runs at least partly contemporaneously with play of the table game, and
the CPU is adapted to determine, based at least partly on said eligibility data, and independent of play of the table game after initiation thereof and of each outcome of the table game, whether each player position of the plurality of predetermined player positions is an eligible position.

22. A method of gaming, the method including:
a) providing apparatus for playing at least part of a feature game during the playing of a table game, the table game having predetermined table game winning criteria, the apparatus including
a gaming table having a plurality of predetermined player positions for playing of the feature game and table game by a plurality of players and
a gaming computer system, the computer system including
a bet data receiving component,
a temporary memory,
a programmable unit adapted to be programmed with trigger data and eligibility data, and
a CPU,
b) enabling the placing of a respective position wager at, or so as to be associated with, each player position of said plurality of predetermined player positions, by each of one or more player of said plurality of players that is playing at the respective player position, wherein at least a portion of the respective position wager is a table game allocation allocated for playing the table game and at least a portion of the respective position wager is a feature game allocation allocated for playing the feature game;
c) receiving, by means of the bet data receiving component, bet data in relation to each player position of said plurality of predetermined player positions at, or in association with which, said one or more player has placed a respective wager, the bet data representing, for each of the respective player positions for which the bet data is received, an identification of the respective player position and representing a quantum of the respective feature game allocation, if any, of each position wager placed at, or so as to be associated with, the respective player position by each player playing at that position;
d) storing the bet data received by the bet data receiving component in the temporary memory;
e) determining, with the CPU, basted at least on said trigger data, feature game triggering criteria and determining, based at least partly on the triggering criteria, and independent of play of the table game after initiation thereof and of each outcome of the table game, whether the feature game is to be triggered to run in relation any player position of said plurality of predetermined player positions, and for each player position of the plurality of predetermined player positions for which the CPU determines that the feature game is to be triggered to run, triggering the running of the feature game such that it runs at least partly contemporaneously with play of the table game, and
f) determining, with the CPU, and based at least partly on said eligibility data, and independent of play of the table game after initiation thereof and of each outcome of the table game, whether each player position of said at least one predetermined player position for which the CPU determines that the feature game is to be triggered to run, is an eligible position being a position that is eligible to receive an award on a winning occurrence, for the respective position, of the feature game.

23. A method of gaming according to claim 22 wherein said receiving, by means of the bet data receiving component, of bet data according to step c) includes receiving of respective bet data from bet detection apparatus which is adapted to automatically detect at which particular player positions of said plurality of predetermined player positions players of said plurality of players are playing, and the quantum of each feature game allocation of each wager placed at, or so as to be associated with, said particular positions.

24. A method of gaming according to claim 22 wherein step f) includes determining with the CPU, whether each player position of said at least one predetermined player position for which the CPU determines that the feature game is to be triggered to run, is an eligible position based at least partly on bet data that has been received by the bet data receiving component.

25. A method of gaming according to claim 22 wherein step f) includes determining independent of play of the table game after initiation thereof, and independent of each outcome of the table game, a quantum of each feature game award to be made to the respective player position based at least partly on bet data that has been received by the bet data receiving component.

26. A method according to claim 22 wherein the apparatus includes a random number generator and the method includes the step of determining, with the CPU, based partly on a number generated by the random number generator, whether the feature game is to be triggered to run in relation to any player position of said plurality of predetermined player positions.

27. A method of gaming according to claim 22 wherein step f) includes determining, for each eligible position, independent of play of the table game after initiation thereof, and independent of each outcome of the table game, a quantum of each feature game award to be made to the respective player position.

28. A method of gaming according to claim 22 wherein
step e) includes determining, with the CPU, based at least on the triggering criteria, and independent of play of the table game after initiation thereof and of each outcome of the table game, whether the feature game is to be triggered to run, and if it is determined that the feature game is to be triggered to run, triggering the running of the feature game for all player positions of the plurality of predetermined positions, such that it runs at least partly contemporaneously with play of the table game, and
step f) includes, determining with the CPU, and based at least partly on said eligibility data, and independent of play of the table game after initiation thereof and of each outcome of the table game, whether each player position of said at least one predetermined player position, is an eligible position.

* * * * *